United States Patent [19]

Haynes

[11] Patent Number: 4,629,205
[45] Date of Patent: Dec. 16, 1986

[54] MOTORCYCLE FRONT FORK ASSEMBLY

[76] Inventor: Terence A. Haynes, 20, Rectory Grove, Croydon, Surrey, England

[21] Appl. No.: 595,570
[22] PCT Filed: Jul. 22, 1983
[86] PCT No.: PCT/GB83/00179
 § 371 Date: Mar. 7, 1984
 § 102(e) Date: Mar. 7, 1984
[87] PCT Pub. No.: WO84/00526
 PCT Pub. Date: Feb. 16, 1984
[51] Int. Cl.⁴ .......................................... B60K 21/02
[52] U.S. Cl. .................................. 280/277; 280/286
[58] Field of Search ............. 280/277, 276, 285, 286, 280/288, 284, 691; 188/26, 27

[56] References Cited

U.S. PATENT DOCUMENTS

| 4,179,135 | 12/1979 | Slater | 280/276 |
| 4,184,695 | 1/1980 | Roe et al. | 280/277 |
| 4,186,936 | 2/1980 | Offenstadt et al. | 280/277 |
| 4,367,882 | 1/1983 | Alexander et al. | 280/276 |
| 4,401,316 | 8/1983 | Miyakoshi | 280/277 |
| 4,410,196 | 10/1983 | Ribi | 280/276 |

FOREIGN PATENT DOCUMENTS

| 546631 | 3/1932 | Fed. Rep. of Germany . | |
| 2900106 | 7/1980 | Fed. Rep. of Germany | 280/277 |
| 524288 | 4/1955 | Italy | 280/277 |
| 535690 | 11/1955 | Italy | 280/277 |
| 119610 | 4/1927 | Switzerland . | |
| 693646 | 7/1953 | United Kingdom | 280/277 |
| 744538 | 2/1956 | United Kingdom | 280/277 |
| 1545403 | 5/1979 | United Kingdom . | |

Primary Examiner—David M. Mitchell
Assistant Examiner—Mark C. Dukes
Attorney, Agent, or Firm—Sandler & Greenblum

[57] ABSTRACT

A motorcycle front fork assembly comprises substantially parallel fork legs (15), each leg being connected to an articulated linkage (16). The articulated linkage comprises a telescopic member (19) concentric with or adjacent to each fork leg (15) and axially movable substantially in the plane of the fork legs and a suspension link (17) having a first end for supporting a wheel spindle (24), a second end (22), and being pivotally connected between the two ends (22, 24) to the telescopic member (19). So that trail variations may be kept to the minimum, restraining means pivotally connect the second end (22) of the suspension link (17) to the leg (15) and allow translational movement of the second end (22) during axial movement of the telescopic member (19) in response to movement of the said first end (24). By simple experiment suitable dimensions may be determined to maintain trail variation substantially constant for any steering variation. The restraining means may be in the form of a link (18) pivotally connected between the second end (22) and the leg (15), or for example a slider or roller moving along a guide or track arranged between the second end (22) and the leg (15).

23 Claims, 10 Drawing Figures

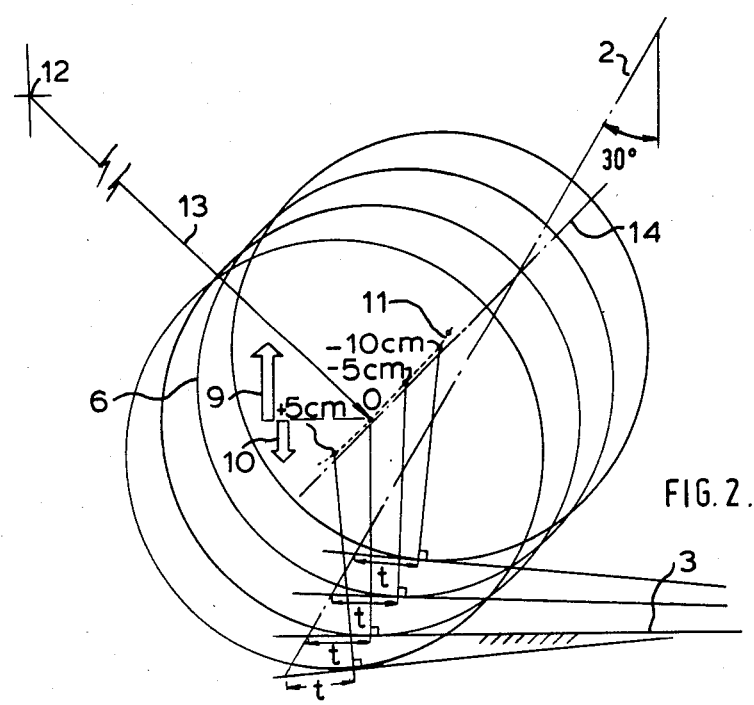
FIG. 2.
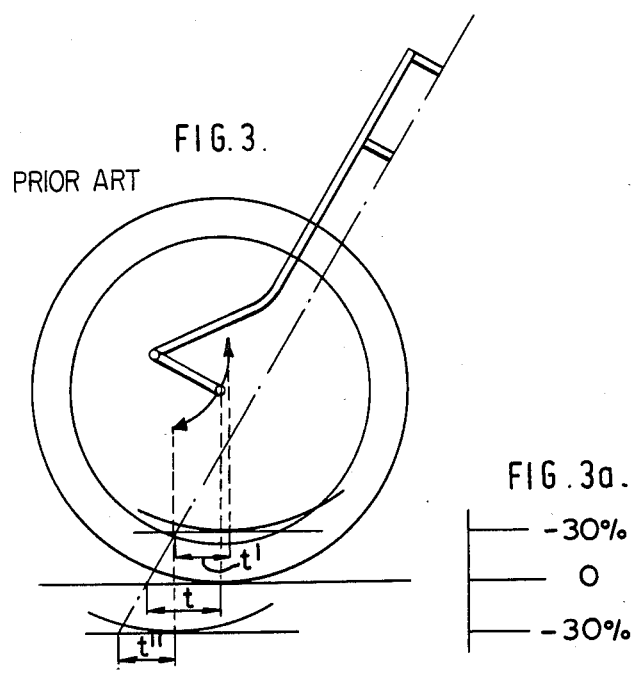
FIG. 3.
PRIOR ART
FIG. 3a.
— -30%
— 0
— -30%

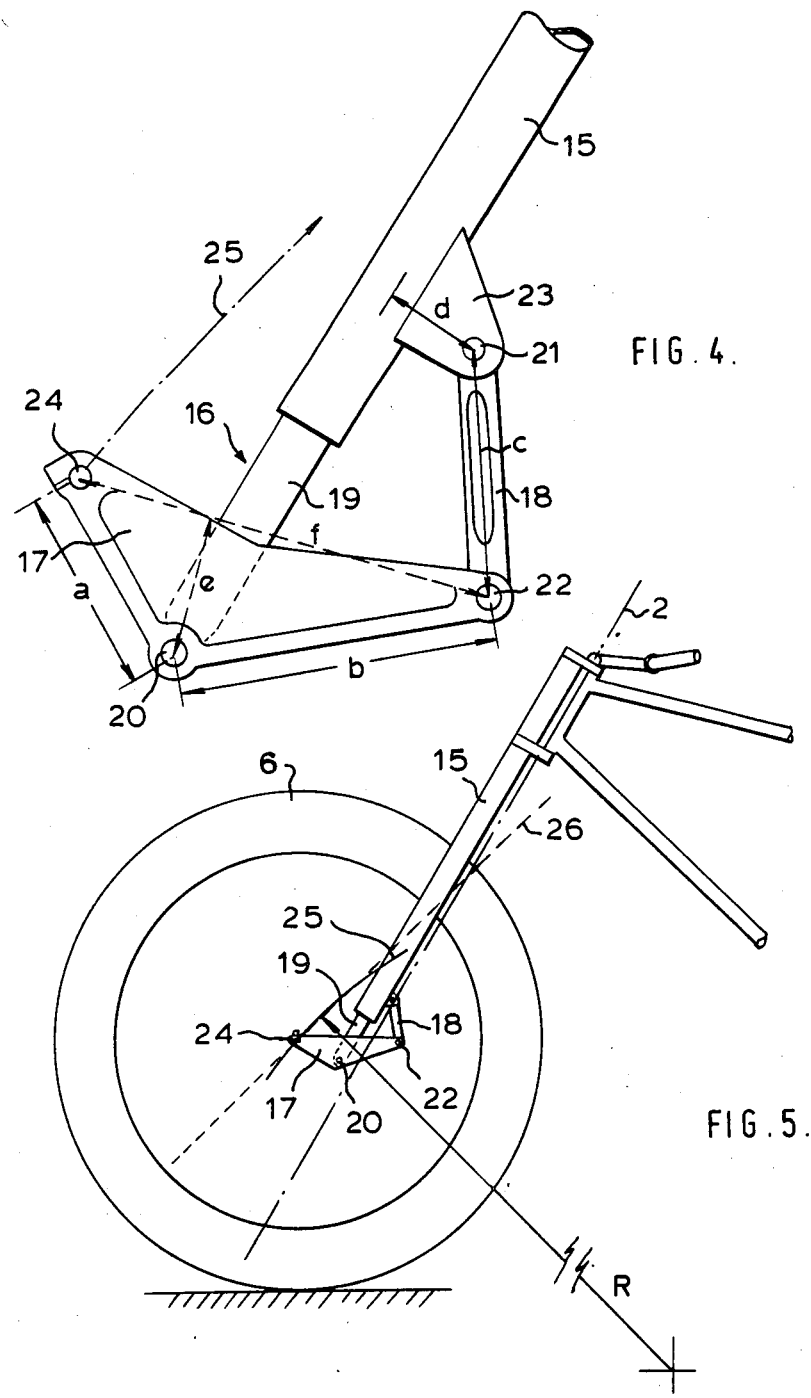

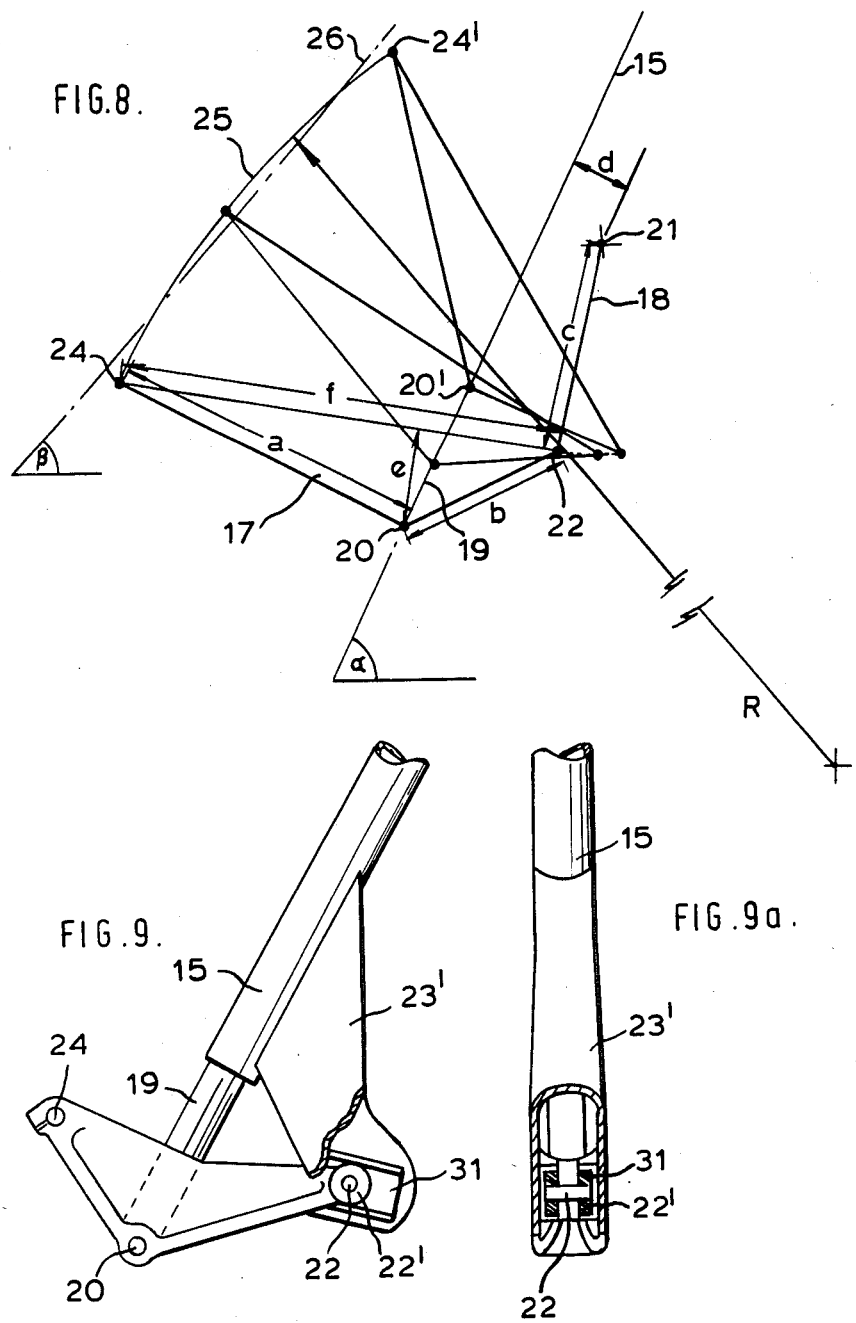

MOTORCYCLE FRONT FORK ASSEMBLY

This invention relates to a motorcycle front fork assembly.

Improvements in motorcycle engine power and tire "grip" in recent years have drawn attention to deficiencies inherent in the design of conventional front forks, which are the means commonly applied to support the front wheel of the vehicle and to steer, control and balance it.

In particular the increase in performance arising from these improvements has highlighted those factors that tend to cause steering instability of the kind that is termed "flutter" or "weave". This form of instability is characterised by a side-to-side oscillation of the front forks and wheel which in extreme circumstances can lead to structural damage or loss of control. The most significant factors that can induce this oscillation are believed to be (a) changes in the steering geometry of the vehicle arising from suspension travel and (b) torsional flexibility in the fork assembly.

The overwhelming majority of motorcycles currently produced use the "telescopic" form of front fork. This comprises two parallel legs each formed as a pair of concentric tubular members having resilient suspension means acting between the tubular members. A wheel spindle is rigidly connected to, and extends between, the lower ends of the two legs. For there to be sufficient clearance between the tubular members of each leg to allow relative telescopic movement, there must also be some degree of relative lateral movement, and therefore lateral stiffness is impaired. Further, because the tubular members of each telescopic leg are free to rotate relative to each other, it is not possible to exploit the torsional properties of the individual components of the fork. Thus, the torsional rigidity of the assembly as a whole is poor. A further defect is the friction developed by telescopic forks that often prevents smooth functioning over road irregularities; this condition is known as "stiction" and becomes more apparent as the forks are raked away from the vertical.

However, a far more serious defect occurs with variations in steering geometry produced, e.g. by road irregularities.

The variations in steering geometry are best illustrated with reference to the change in angle of the steering head axis. The angle of the steering head axis is specified at the normal weight of the vehicle when statically loaded, which would generally be at one third of suspension travel at both wheels. However, it will be apparent that under practical road conditions the effective steering head angle can vary given that each wheel can move independently from full extension to full compression.

Thus under heavy braking, weight transfer will compress the front suspension fully whilst allowing the rear suspension to become fully extended, thus giving rise to a steeper head angle. Similarly, hard acceleration will cause the front suspension to become fully extended and the rear suspension to be fully compressed, thus giving rise to a shallower head angle. Road irregularities can produce a similar situation. Thus when the vehicle passes over a large bump in the road surface, first the front suspension and then the rear suspension will be compressed, thus causing changes in the effective head angle.

This change in head angle can in itself cause disturbances in the steering characteristics of the vehicle, but the major consequence is to the castor effect of the front wheel which is normally termed "trail". Trail is best described as the amount the front wheel "trails" behind the steering head axis. In practice, trail is generally specified as the distance between the tire contact patch and the steering head axis at ground level. As trail is of major importance in determining the steering characteristics of the vehicle, and in particular the self aligning or stabilising forces that contribute to the vehicle stability, any change in this value can have a serious effect on stability. Moreover it is believed that dynamic effects are generated as these changes in geometry inter-act with other forces produced by the machine's passage—principally gyroscopic precession, pendular mass and tire reaction forces—to cause the steering oscillations previously referred to.

Further, it is believed that lack of torsional rigidity in telescopic forks can increase this tendency, since it permits the wheels to travel further out of line than would be the case if the fork was of greater lateral stiffness (lateral stiffness is measured as the resistance provided by the fork assembly to sideways deflection of the front wheel at the lower point on the wheel rim, with the assembly held stationary at its upper end).

From GB Patent Specification No. 744 538 a motorcycle front fork assembly is known which comprises substantially parallel fork legs each leg being connected to an articulated linkage comprising a telescopic member housing resilient suspension means and being concentric with or adjacent to each fork leg and axially movable substantially in the plane of the fork legs; a suspension link having a first end for supporting a wheel spindle, a second end, and being pivotally connected between the two ends to the telescopic member.

The second end of the suspension link is attached to an extension of the fork leg. In order to allow movement of the suspension link, the telescopic member has to be able to pivot with respect to the fork leg and therefore, a special mounting is required. Consequently the telescopic member has no influence on the suspension path generated by wheel movement.

The main disadvantage however, of such a construction is that trail varies considerably since movement of the wheel to provide suspension—as plotted at the wheel spindle—can only be an arc whose radius is determined by the length of the suspension link. Since this is limited by considerations such as ground clearance, and the weight and flexibility of the link and the extension on which it is pivoted, the resultant arc will always be of comparatively small radius. Such a small radius of operation will introduce trail variations and necessarily restrict the total suspension travel available.

An object of the present invention is to provide a motorcycle front fork assembly in which trail variations are minimized, and preferably in which the lateral stiffness is improved.

The characterising feature of the present invention is the provision of restraining means pivotally connecting the second end of the suspension link to the leg and allowing translational movement of the second end during axial movement of the telescopic member in response to movement of the said first end.

By simple experimentation suitable dimensions of the above component parts for any type of motorcycle may be derived whereby trail variation is substantially removed. Furthermore, the telescopic member may now be non-pivotally thereby improving lateral stiffness.

As will be explained below, it is possible to confer greater flexural stiffness to such a front fork assembly.

The invention will now be described with reference to embodiments shown by way of example in the accompanying drawings, wherein:

FIG. 2 shows diagrammatically the desired path of wheel spindle travel to achieve minimum trail variation.

FIG. 3 shows diagrammatically trail variation using a trailing link suspension,

Figure 6:
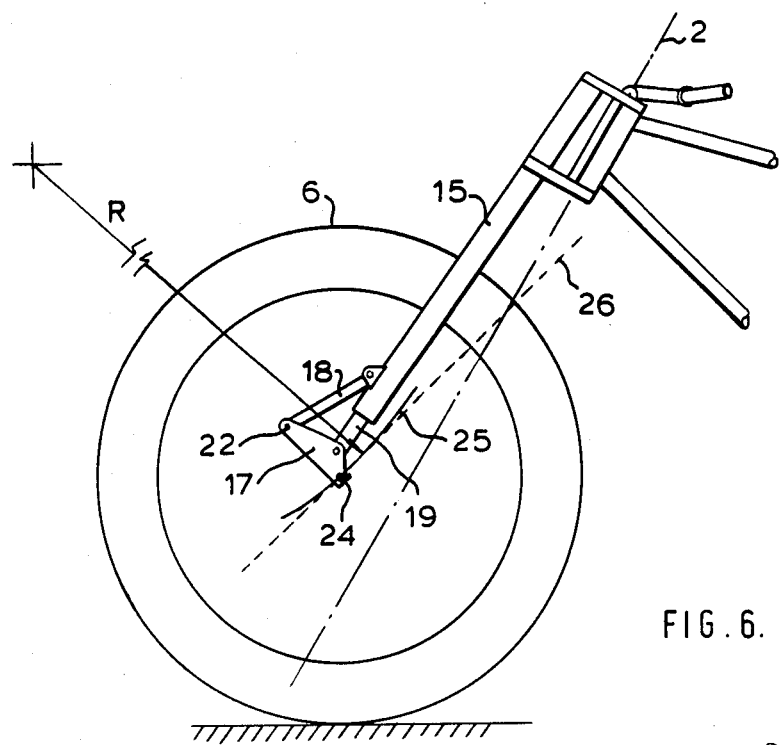
Figure 7:
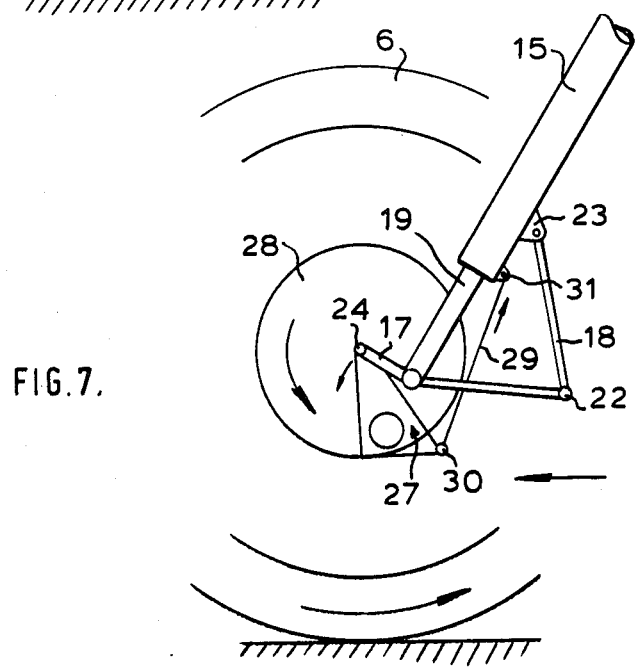

FIG. 4 shows in elevation part of a first embodiment of a motorcycle front fork assembly according to the invention, FIG. 5 shows diagrammatically the embodiment of FIG. 4 in place in a motorcycle, FIG. 6 shows in elevation a second embodiment of a motorcycle front fork assembly according to the invention in place in a motorcycle, FIG. 7 shows diagrammatically the embodiment of FIG. 4, incorporating a disc brake caliper assembly, and FIG. 8 shows schematically a motorcycle front-fork assembly so as to illustrate suitable dimensions.

FIGS. 9 and 9a show in elevation and part section, respectively, alternative restraining means.

Figure 1:
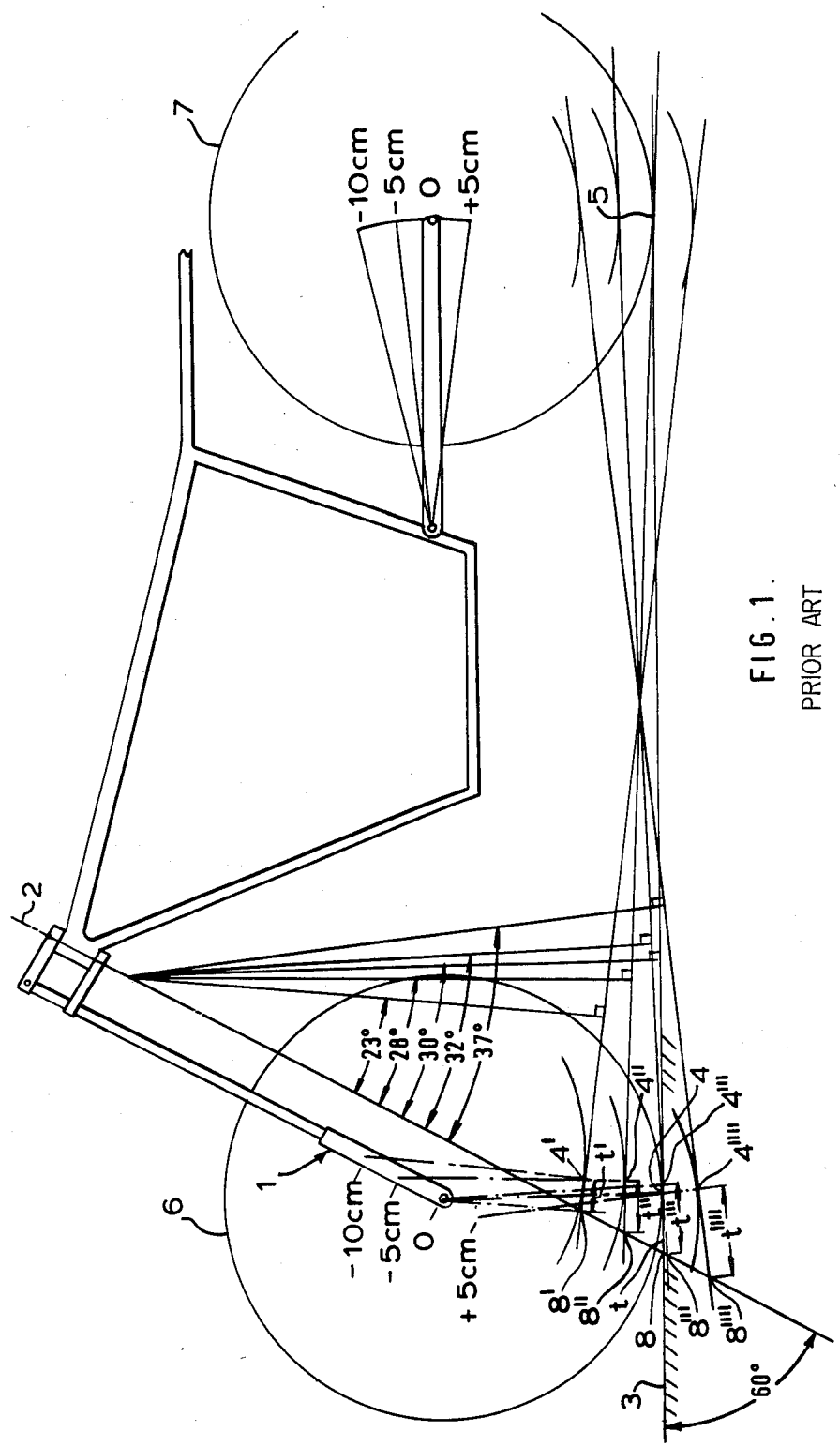
FIG. 1 shows diagrammatically the variation of rake and trail experienced with known telescopic fork assemblies.

In FIG. 1, a motorcycle has a telescopic front fork assembly 1 pivotable about a steering head axis 2 inclined to the horizontal datum line 3 by an angle of 60°. The horizontal datum line 3 is normally defined as the line passing through the tire contact points 4, 5 of both wheels 6, 7. In a static condition the axis 2 is inclined at 30° to the vertical, and "trail" is the distance t between the contact point 4 and the point 8 of intersection of the extended axis 2 and the horizontal datum line 3.

As the front wheel 6 travels over a bump or a hollow, the front fork assembly 1 is compressed or expands, respectively. The steering head angle, and hence the angle between the axis 2 and the vertical alters with suspension travel. FIG. 1 shows the extent of variation of trail t-t''''. Assuming t=0, the percentage changes are: t' is 46% less than t; t'' is 14% less than t; t''' is 14% more than t; t'''' is 51% more than t.

FIG. 2 illustrates the path that the front wheel 6 of a typical motorcycle must follow with suspension movement to achieve substantially zero trail variations under the same conditions. The amount of compression and extension from the static condition is indicated by the arrows 9 and 10 respectively. As can be seen in this example, which is based on the same overall steering geometry and dimensions as FIG. 1, the "ideal" wheel spindle movement is a shallow arc 11 having a centre 12 somewhat above and in front of the vehicle. Because of the length of radius 13 necessary to generate such a shallow curve 11 it would not be practicable to use a simple form of "trailing link" suspension, as shown in FIG. 3, as the resulting arms and supporting structure would be too long to be rigid and would add excessive pendular mass to the steering system. FIG. 3a shows the typical percentage variation in trail actually obtained with the trailing link suspension of FIG. 3, with equal, simultaneous wheel movement.

In FIG. 2 a mean line 14 passed through the arc demonstrates that the "ideal" curve is inclined considerably further from the vertical than can be accommodated by merely re-positioning telescopic forks to achieve this effect. Even if this expedient could be used the forks would be raked far too much to be effective as a suspension medium. As has been mentioned, the frictional qualities of telescopic forks become worse the further they are inclined away from the vertical—and therefore the more disadvantageously they are placed with regard to road shocks. It should be pointed out that the "ideal" curve need not be a circular arc, but may be irregular or parabolic, or even a substantially straight line.

FIG. 4 shows a first embodiment of the invention in which trail variation is minimal. A motorcycle front fork assembly includes a pair of parallel fork legs, only one leg 15 being shown. The leg 15 lies substantially in the same plane as the steering axis (see FIG. 5). At the base of each leg is an articulated mechanism 16 comprising three members, i.e. a suspension link 17, a restraining link 18, and a telescopic member 19. In this embodiment the tubular member 16 is concentric with the fork leg 15, but other arrangements are possible whereby the telescopic member 16 is arranged adjacent to the leg 15 provided that the telescopic motion of movement of the member 16 is substantially in the plane of the fork leg 15.

A conventional suspension device (not shown) comprising a compression spring and damper unit to provide a resilient suspension medium is incorporated between the telescopic member 18 and the leg 15. However, alternative arrangements are possible whereby the suspension device is disposed differently or provided by different means for, for example by the compression of a gas or rubber compound. The suspension medium need not act through the telescopic member 19, but could by way of example be anchored at its lower end adjacent to the forward extremity of link 18 the wheel spindle, and anchored at its upper end by means of a lug or bracket to the outside of leg 15.

The suspension link 17 is connected to the telescopic member 19 by a pivot bearing 20. It can be seen that the suspension link is shaped as a bellcrank lever with a line connecting the ends 22, 24 lying above the pivotal connection 20 of the suspension link 17 to the telescopic member 19. The restraining link 18 connects the suspension link 17 to the rear of the fork leg 15 by means of pivot bearings 21, 22 at either end of the retraining link 18 and a lug or reaction bracket 23 off-setting the bearing 21 from the central axis of the fork leg 15.

At the forward extremity of each suspension link 17 a clamping arrangement is provided to locate rigidly and hold the wheel spindle 24. Thus, the wheel is rigidly held between the two legs of the fork, the dimensions of the wheel spindle and the clamping arrangement being so designed as to confer torsional rigidity. Thus the suspension links 17 are constrained to move together with wheel movement, whilst movement is resisted by the suspension medium disposed above the telescopic member or elsewhere. The suspension unit is omitted from the illustrations for clarity.

In operation, movement of the wheel to provide suspension causes the suspension links 17 to exert an upward force on the telescopic members 19, while restraining links 18 are under a corresponding tensile load. As the telescopic members 19 slide in each leg 15 the angular relationship between the three members 17, 18 and 19 changes in such a manner as to confer a motion represented by the line 25 at the wheel spindle 24.

The characteristics of this motion are determined by the distance a between the wheel spindle 24 and the pivot bearing 20, the distance b between the pivot bearings 20 and 22, the length c of the restraining link 18, the "offset" d of the pivot bearing 21 from the centre longitudinal axis of the leg 15, and the vertical displacement e of the pivot bearing 20 from a line drawn between the pivot bearing 22 and the wheel spindle 24. The wheel spindle motion 25 in this embodiment may be substantially straight over the major portion of its travel, or be arcuate in character with its centre at a large radius R and lying to the rear and below the front wheel.

Thus it is possible to select experimentally (see below with reference to FIG. 8) a set of dimensions for the three moving members 16, 17 and 18 of each fork leg to produce a line 25 that approximates to the mean zero-trail line 14 illustrated in FIG. 2. The zero mean-trail line is tangent to the arcuate path of movement of the wheel spindle taken at the position of the wheel spindle in the static condition. Moreover by selecting alternative dimensions it is possible to produce a motion 25 to approximate the mean zero trail line for any particular motorcycle geometry regardless of steering head angle, trail, wheelbase, suspension travel, etc.

In the embodiment shown in FIG. 6 the links are arranged so that the wheel spindle 24 is located to the rear of the fork leg whilst the restraining link 18 connects the link 17 and the fork leg 15 at the front. Here the line connecting the ends 22, 24 of the suspension link 17 shaped as a bellcrank lever lies below the pivotal connection of the suspension link 17 to the telescopic member 19. The geometry of this arrangement is such that the curve 25 thus generated can share substantially the same path as the ideal zero-trail curve 11 illustrated in FIG. 2, or be a substantially straight line approximating to the mean line 26 shown in FIG. 6.

The principle of operation of this embodiment is identical with that of FIGS. 4 and 5 in that movement of the wheel spindle 24 moves the suspension link 17 and thus induces a sliding motion of the telescopic member 19. The geometry of these components plus that of the restraining link 18 produces a motion of the desired characteristics, this being related to the dimensions of the moving members 16, 17 and 18 and their relationship to the fork leg 15.

In both of the embodiments described above the suspension medium need not necessarily be associated directly with the telescopic member 19, although convenience may indicate that this is a preferred arrangement.

Because the load path from fork leg 15 to wheel spindle 24 is conveyed via two paths, i.e. through the suspension link 17 via the restraining link 18 and via the telescopic member 19, torsional rigidity of each fork leg is maintained. Thus flexural rigidity of the complete assembly is improved in comparison with a telescopic fork where each fork leg is unable to convey torsional loads. Further, because the dimensions of fork leg 1 are independent of the dimensions of the other components these may be proportioned to confer great stiffness. Thus whilst it is unusual for telescopic fork stanchions to exceed 40 mm in diameter the fork legs 15 can be much larger, for example 60 mm in diameter, with a corresponding increase in stiffness.

Moreover, because the bearing surface provided for the telescopic member 19 is internal to fork leg 15, its external profile need not be circular and can be constructed in a manner and to a profile designed to confer maximum stiffness.

Another advantageous feature is the mechanical advantage or leverage exerted by the suspension link 17 upon the telescopic member 19. By arranging (consistent with the other objects of the assembly) for the pivot point 20 to be some distance from the wheel spindle 24, an element of mechanical advantage is introduced that results in a differential in movement between those points with suspension travel. Thus in the example illustrated for every 10 cm of movement the spindle 24 along the path 25, the point 20, and thus the telescopic member 19, moves only 6 cm. Changes in the geometry of the members 17, 18 and 19 may enhance or reduce this effect.

The consequences of this differential are twofold. Firstly the effective 'unsprung' weight of the telescopic member 19 is reduced in direct proportion to the ratio of this differential, and thus the response to road shocks of the suspension is improved in that the overall inertia of the assembly is thereby reduced. Secondly the upward force exerted by the bearing 20 upon the telescopic member 19 is increased, again in direct proportion to the differential of movement. This upward force assists in overcoming the resistance to initial movement, i.e. "stiction" commonly experienced in telescopic fork elements.

Another advantage of the assembly according to the invention is illustrated diagramatically in FIG. 7. As a consequence of the pivotal inter-connection of the principle parts of the assembly it is possible to provide a further feature that is beneficial.

In FIG. 7, a disc brake comprises a disc brake caliper assembly 27 which is pivotally mounted on the wheel spindle 24 and acts upon a disc 28. The caliper assembly 27 is restrained from rotating about the spindle 24 by a torque arm 29, which is connected pivotally at one end at pivot 30. The other end of the torque arm 29 is anchored pivotally on the fork leg 15 at mounting 31.

Under braking, the caliper assembly 27 is subjected to a force tending to turn it in the direction of wheel rotation (counter clockwise in FIG. 7), and this force is transmitted along the torque arm 29 to act upon the fork leg 15. Thus braking forces are arranged to exert an upward force on the legs 15, and thereby a corresponding downward force on the suspension link 17 and the telescopic member 15. By this means the braking forces tend to resist compression of the suspension and thereby compensate for the weight transfer that causes additional loads to be thrown on the front suspension. By suitable arrangement of the pivot points it is possible in this manner to prevent the suspension from being fully compressed by weight transfer and to leave the normal wheel travel unaffected to deal with road irregularities. Other arrangements of the same principle mechanism are possible without departing from the scope of the invention. Moreover by arrangement of the geometry of the linkage mechanism it is possible to produce this opposition of braking and weight transference forces by rigidly attaching the brake caliper to the suspension link 17. Thus, the disc brake caliper is subjected to a force tending in the same direction as wheel travel and thereby acting upon the suspension link 17 to rotate it in such a sense as to oppose suspension compression under weight transference.

The following two examples give suitable dimensions of the features of the motorcycle front assembly so as to provide a substantially constant trail. These dimensions have been ascertained experimentally for representative production motorcycles. Dimensions for other motorcycles may also be ascertained by simple experiment.

| EXAMPLE 1 - 400 cc off-road motorcycle | | | |
|---|---|---|---|
| Rake/Steering angle | | = | 30 |
| Trail | | = | 127 mm |
| Wheelbase | | = | 1455 mm |
| Front suspension travel | | = | 241 mm |
| Rear | | = | 254 mm |
| Front wheel diameter | | = | 685.8 mm |
| Rear wheel diameter | | = | 584 mm |
| Suspension link 17: | a | = | 260 mm |
| | f | = | 426 mm |
| | e | = | 105 mm |
| Restraining link 18: | c | = | 195 mm |
| | d | = | 120 mm |
| Telescopic member 19: | | | |
| excursion 20-20' | | = | 173 mm |
| Wheel spindle 24: | | | |
| excursion 24-24' | | = | 334 mm |
| Leverage Ratio | | = | 1.93:1 |
| Radius R | | = | 1168 mm |
| Angle ($\bar{\beta}$) of mean line 26 producing zero trail variation | | = | 50.5° |
| EXAMPLE 2 - 1,000 cc Sports/Touring motorcycle | | | |
| Rake/Steering angle | | = | 26° |
| Trail | | = | 89 mm |
| Wheelbase | | = | 1500 mm |
| Front suspension travel | | = | 127 mm |
| Rear suspension travel | | = | 94 mm |
| Front wheel diameter | | = | 584 mm |
| Rear wheel diameter | | = | 584 mm |
| Suspension link 17: | a | = | 120 mm |
| | f | = | 165 mm |
| | e | = | 35 mm |
| Restraining link 18: | c | = | 75 mm |
| | d | = | 22 mm |
| Telescopic member 19: | | | |
| excursion 20-20' | | = | 55 mm |
| Wheel spindle 24: | | | |
| excursion 24-24' | | = | 153 mm |
| Leverage Ratio | | = | 2.78:1 |
| Radius R | | = | 297.6 mm |
| Angle ($\bar{\beta}$) of mean line 26 producing zero trail variation | | = | 42° |

It will be apparent that the restraining link 18 may be replaced by any other restraining means to constrain movement of the point 22 in a translational direction as shown in FIG. 8. The restraining means may for example be in the form of a roller and track mechanism as shown in FIGS. 9 and 9a. A roller 22' is constrained to move within a track 31 carried by a bracket or arm 23' fixed to the leg 15.

Other restraining means will be apparent, e.g. the roller 22' may be replaced by a trunnion slidable along a track rigidly fixed to the leg 15. Alternatively, a cylinder-piston assembly could be connected between the point 22 and a carrier fixed to the leg 15. The essential feature of any suitable restraining means is that its pivotal and translational movement forces any movement of the wheel spindle 24 to produce a corresponding axial movement only of the telescopic member 19 via the pivotal connection 20, the dimensions being such that trail variation is substantially eliminated.

I claim:

1. A motorcycle having a rear suspension, a steering axis, and a front fork assembly comprising: substantially parallel fork legs, at least one of said legs being connected to a linkage comprising an axially movable telescopic member, said axially movable telescopic member being positioned to axially move within said at least one leg, and means for minimizing trail variation under pitching conditions, said means comprising:

a suspension link for linking a wheel spindle to at least one of said telescopic members; and restraining means for restraining said wheel spindle along an arcuate path upon extension and compression of said telescopic member, said arcuate path being such that the means line through said arcuate path intersects the steering axis above said wheel spindle in a manner whereby trail variation under pitching conditions is minimized.

2. The motorcycle as defined by claim 1 wherein said suspension link is secured at one end to said wheel spindle.

3. The motorcycle as defined by claim 2 wherein said restraining means comprises a restraining link securing said suspension linkage to one of said legs.

4. The motorcycle as defined by claim 3 wherein said restraining link and said wheel spindle are secured at opposite ends of said suspension linkage.

5. The motorcycle as defined in claim 3 wherein said restraining link comprises a guide therein, and wherein said guide to produce a corresponding axial movement within said telescopic member in response to movement of a force applied to the wheel spindle.

6. The motorcycle as defined by claim 4 wherein said telescopic member is secured on said suspension linkage between said wheel spindle and said restraining link.

7. The motorcycle as defined by claim 6 wherein said suspension linkage is shaped in the form of a bellcrank lever.

8. The motorcycle as defined by claim 6 wherein said suspension linkage trails said wheel spindle with said telescopic member and said restraining link being secured to the rear of said wheel spindle.

9. The motorcycle as defined by claim 8 wherein said telescopic member is secured at a point on said suspension linkage between and beneath said wheel spindle and said restraining link.

10. The motorcycle as defined by claim 6 wherein said suspension linkage leads said wheel spindle with said telescopic member and said restraining link being secured to the front of said wheel spindle.

11. The motorcycle as defined by claim 1 further comprising a disc brake caliper rotatably mounted on the front wheel.

12. The motorcycle as defined by claim 11 wherein said brake caliper is pivotably connected by a torque arm to one of said legs, whereby application of the disc brake causes said suspension linkage to pivot in a direction which opposes compression of said telescopic member within said leg which otherwise occurs during braking, whereby the effects of weight transference during braking are minimized.

13. The motorcycle as defined by claim 12 wherein said disc brake caliper is rigidly attached to said suspension linkage.

14. A motorcycle having a rear suspension and a front fork assembly comprising:

two substantially parallel fork legs, each leg being connected to a linkage comprising: a telescopic member axially movable within each fork leg; and means for minimizing trail variation under pitching conditions, said means comprising a suspension linkage having a first end supporting a wheel spindle, and a second end, and being pivotably connected between the two ends to the telescopic member at a pivot point displaced in a substantially vertical plane from an imaginary line joining the two ends; and restraining means pivotally connecting the second end of the suspension linkage to a leg to allow for translational movement of the second end in response to movement of the telescopic member in response to movement of said first end.

15. The motorcycle as defined by claim 14 wherein said second end and said restraining means are arranged rearwardly of the fork legs, and the pivot point lies below said imaginary line joining the two ends.

16. The motorcycle as defined by claim 14 wherein said second end and said restraining means are arranged forwardly of the fork legs, and the pivot point lies above said imaginary line joining the two ends.

17. The motorcycle as defined by claim 14 wherein said restraining link comprises a link pivotably connected to said second end and said leg.

18. The motorcycle as defined by claim 14 wherein said restraining means comprises a sliding member movable along a guide arranged between the second end and the leg, and wherein said restraining means is securely affixed to said leg.

19. The motorcycle as defined by claim 14 wherein said suspension linkage is shaped as a bellcrank lever.

20. The motorcycle as defined by claim 14 wherein said wheel is clamped between the first ends of each of said suspension linkages.

21. The motorcycle as defined by claim 20 further comprising a disc brake caliper rotatably mounted on said front wheel and pivotally connected via a torque arm to one of said legs whereby application of the disc brake caliper forces opposing movement of said suspension linkage to minimize the effects of weight transference during braking.

22. The motorcycle as defined by claim 21 wherein said disc brake caliper is rigidly secured to said suspension linkage.

23. A motorcycle having a rear suspension, a steering axis, and a front fork assembly comprising two substantially parallel fork legs, each leg being connected to a linkage comprising an axially movable telescopic member, said axially movable telescopic member being positioned within said leg, and means for minimizing trail variation under pitching conditions, said means comprising:

a suspension link for linking the wheel spindle to at least one of said telescopic members; and restraining means for constraining said wheel spindle along an arcuate path upon extension or compression of said telescopic member, said arcuate path being configured to produce a motion of said wheel spindle which approximates a mean zero-trail line which intersects said steering axis above said wheel spindle, whereby trail variation under pitching conditions is minimized.

* * * * *